Feb. 6, 1940.   H. L. SQUIRES   2,189,035
REAMER
Filed Dec. 8, 1938

INVENTOR.
H. L. SQUIRES.
BY
J. Vincent Martin
Ralph K. Browning
ATTORNEYS.

Patented Feb. 6, 1940

2,189,035

UNITED STATES PATENT OFFICE 2,189,035

REAMER

Howard L. Squires, Houston, Tex., assignor to Reed Roller Bit Company, Houston, Tex., a corporation of Texas Application December 8, 1938, Serial No. 244,536

5 Claims. (Cl. 255—73)

This invention relates to reamers for use in drilling wells. It has for its general object the provision of a structure whereby a reamer cutter of the roller type may be firmly and rigidly mounted within a cutter recess in a reamer body.

In mounting reamer cutters within their recesses, it is desirable that there be no possibility of play between any of the parts constituting the mounting during the operation of the reamer. It is, therefore, an object of this invention to provide a structure for mounting a reamer cutter in a recess in the side of a reamer body in such a manner as to give the greatest possible degree of rigidity to the mounting, prevent any play or lost motion between the parts of the mounting during the operation and at the same time utilize the smallest number of parts and eliminate any parts which might be broken or distorted in use.

It is a further object of this invention to provide a structure in which reamer cutters may be most easily and quickly and at the same time most rigidly and securely mounted within their recesses. It is also an object that such mounting will permit easy and quick removal of such reamer cutters when desired.

It is a further object of this invention to provide a structure which will make it possible to assemble a reamer cutter upon its cutter pin and to provide supporting blocks upon the ends of the cutter pin, after which the assembly so formed may be mounted upon a cutter body and dismounted therefrom as a unit whenever desired and without damage to any of the parts employed.

It is a further object that the act of removal and replacement of these assembly units involve the least possible loss of time and the least amount of necessary skill and that it requires no special tools or implements.

Other objects and advantages will become apparent from the following description taken in connection with the accompanying drawing, it being understood that the same are by way of illustration and example only.

Figure 1:
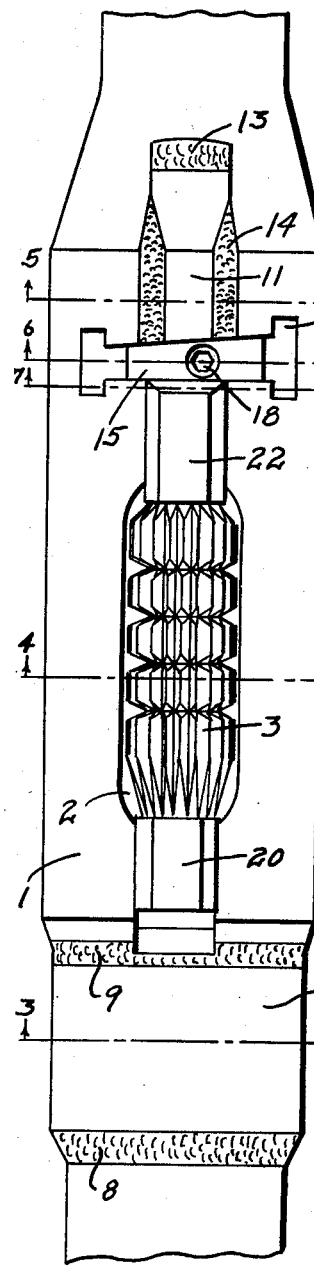
Fig. 1 is a side elevation of a reamer body constructed in accordance with this invention showing the reamer cutters in place therein.
Figure 2:
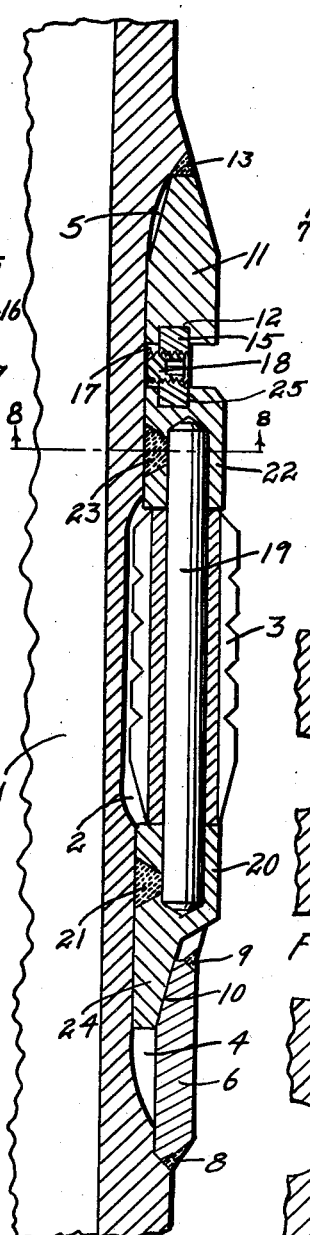
Fig. 2 is a vertical cross section through one wall of the reamer body illustrated in Fig. 1 and through one of the cutters mounted therein.
Figure 3:
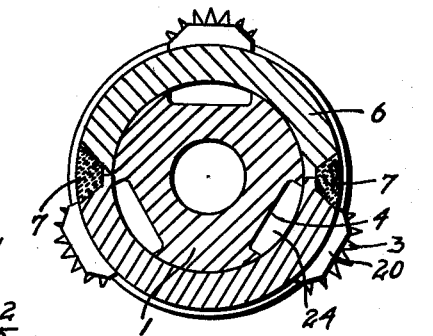
Fig. 3 is a horizontal cross section taken along the line 3—3 of Fig. 1.
Figure 4:
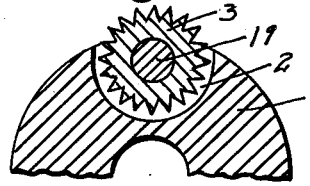
Fig. 4 is a partial horizontal cross section taken along the line 4—4 of Fig. 1.
Figures 5, 6:
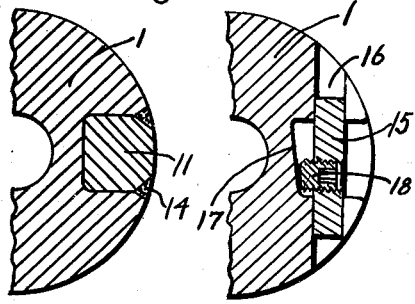
Fig. 5 is a partial horizontal cross section taken along the line 5—5 of Fig. 1.
Fig. 6 is a partial horizontal cross section taken along the line 6—6 of Fig. 1.
Figures 7, 8:
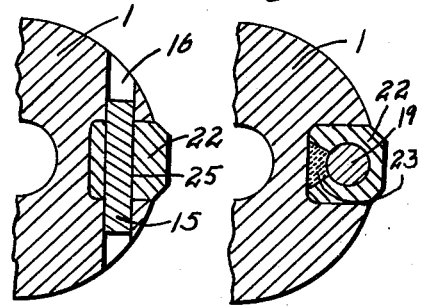
Fig. 7 is a partial horizontal cross section taken along the line 7—7 of Fig. 1.
Fig. 8 is a horizontal cross section taken along the line 8—8 of Fig. 2.

In accordance with this invention, the reamer body 1 is formed with a plurality of major recesses 2, each adapted to receive a reamer cutter 3. At the opposite ends of each of the major recesses are auxiliary recesses 4 and 5 respectively opening into the ends of the major recesses. The recess 4 is of rectangular cross section having opposite parallel sides and a ring 6 is formed in two parts as shown in Fig. 3 and welded about the reamer body overlying the auxiliary recess 4 as illustrated, the welding connection being shown at 7. This ring is also welded along its edge to the reamer body as shown at 8 and 9, respectvely. At the point where it overlies the recess 4, the ring 6 is beveled along its inner surface, as shown at 10, so as to form beneath the ring 6 within the recess 4 pockets which taper downwardly away from the major recess. The upper recess 5 is likewise of rectangular cross section. Within the upper end portion of this recess, there is secured by means of welding, or the like, a block 11 having a notch 12 transversely thereof along its lower edge, that is, the edge nearest the major recess. This block is preferably secured to the body of the reamer by means of welding, such as shown at 13 and 14, so that it forms a rigid part of the body of the reamer. At the lower end of the block 11 and in alignment with the notch 12 across the end of this block is a transversely extending tapering slot or groove 16 in the reamer body adapted to receive a wedge shaped key 15. The lower wall of the slot or groove 16, which is farthest from the block 11 lies in a plane perpendicular to the axis of the reamer body while its upper wall lies in a plane inclined with respect to an intersecting plane perpendicular to the axis providing a slot tapering in one direction. Beneath the slot 16, the auxiliary recess 5 is formed with an inclined bottom surface, as shown at 17 inclined to the inner side wall of groove 16 in Fig. 6, the bottom wall of recess 5 being inclined in the direction toward the narrower part of the slot 16. The key 15 is provided with a set screw 18 extending therethrough and adapted to engage the inclined lower surface 17 of the recess 5 to prevent the key from backing out.

The cutter 3 hereinbefore referred to, is rotatably mounted upon the cutter pin or shaft 19 having a block 20 secured to one end thereof by means of welding 21 and a block 22 secured to the other end thereof by means of similar welding 23. The block 20 has a tapered tongue like part 24 adapted to fit beneath the welded ring 6 and be wedged between that ring and the bottom of the recess 4 and the block 22 is adapted to fit within the recess 5 below the groove 16 and has a notch or groove 25 transversely thereof adapted to be in alignment with the groove 16 and to receive a part of the key 15.

From the foregoing it will be seen that all that is necessary to remove the cutter assembly illustrated from the reamer body is to loosen the set screw 18, drive the key 15 out of the slot 16 and lift the cutter assembly out, the tongue 24 slipping from beneath the ring 6 as the cutter assembly is removed. A new cutter assembly can then be put in place by the reverse operation, the key 15 replaced and driven home to wedge this cutter assembly tightly in position and the set screw 18 then tightened to prevent the key 15 from backing out.

It will be seen from the foregoing that a means has been provided whereby a cutter assembly may be easily and quickly removed from a reamer body and replaced as a unit and without necessity for disturbing the rotatable mounting of the cutter. At the same time, a means has been provided for firmly and securely mounting such cutter assembly with respect to the body and for preventing any possible dislocation thereof during the reaming operation. A minimum number of movable parts is employed and the simplest construction is used. No skill is required in removing or replacing the cutters and no adjustments are necessary. A means has thus been provided for carrying out all of the objects and advantages sought by this invention.

Having described my invention, I claim:

1. In a reamer, a reamer body having a major recess in one side thereof and an auxiliary recess at each end of said major recess, one of said auxiliary recesses being in the form of a tapered socket opening toward said major recess and the other of said auxiliary recesses being open radially outwardly and longitudinally toward said major recess and having an abutment at its end remote from said major recess, a cutter assembly comprising a pair of blocks and a cutter rotatably mounted therebetween, one of said blocks being tapered to wedgingly engage said tapered socket when said assembly is moved lengthwise toward said socket and the other of said blocks being adapted to be positioned in the other of said auxiliary recesses adjacent said abutment, and means for engaging said last mentioned block and said abutment for forcing them apart to force said first block into said tapered socket.

2. In a reamer, a reamer body having a major recess in one side thereof and an auxiliary recess at each end of said major recess, one of said auxiliary recesses being in the form of a tapered socket opening toward said major recess, the other of said auxiliary recesses being open radially outwardly and longitudinally toward said major recess, a cutter assembly comprising a pair of blocks and a cutter rotatably mounted between them, one of said blocks being tapered to wedgingly engage said tapered socket when said assembly is moved lengthwise of said body toward said socket and the other of said blocks adapted to be positioned in the other of said auxiliary recesses, and a key passing through a portion of said body and engaging said last mentioned block to prevent said block from moving radially from its auxiliary recess and for urging it in a direction to force said first block into said tapered socket.

3. In a reamer, a reamer body having a major recess in one side thereof and an auxiliary recess at each end of said major recess, one of said auxiliary recesses being in the form of a tapered socket opening toward said major recess, the other of said auxiliary recesses being open radially outwardly and longitudinally toward said major recess, a cutter assembly comprising a pair of blocks and a cutter rotatably mounted between them, one of said blocks being tapered to wedgingly engage said tapered socket when said assembly is moved lengthwise of said body toward said socket and the other of said blocks adapted to be positioned in the other of said auxiliary recesses and a tapered key passing through a portion of said body and engaging said last mentioned block to prevent said block from moving radially from its auxiliary recess and for urging it in a direction to force said first block into said tapered socket.

4. In a reamer, a reamer body having a major recess in one side thereof and an auxiliary recess at each end of said major recess, one of said auxiliary recesses being in the form of a tapered socket opening toward said major recess, the other of said auxiliary recesses being open radially outwardly and longitudinally toward said major recess and having an abutment at its end remote from said major recess, a cutter assembly comprising a pair of blocks and the cutter rotatably mounted between them, one of said blocks being tapered to wedgingly engage said tapered socket when said assembly is moved lengthwise of said body toward said socket and the other of said blocks being adapted to be positioned in the other of said auxiliary recesses adjacent said abutment, said last mentioned block and the adjacent portion of said body having registering key ways formed therein, and a key passing through a portion of said body and engaging the key ways in said last mentioned block and said body to prevent said block from moving radially from its auxiliary recess and for urging it in a direction to force said first block into said tapered socket.

5. In a reamer, a reamer body having a major recess in one side thereof and an auxiliary recess in each end of said major recess, one of said auxiliary recesses being in the form of a tapered socket opening toward said major recess, the other of said auxiliary recesses being open radially outwardly and longitudinally toward said major recess and having an abutment at its end remote from said major recess, a cutter assembly comprising a pair of blocks and a cutter rotatably mounted between them, one of said blocks being tapered to wedgingly engage said tapered socket when said assembly is moved lengthwise of said body toward said socket and the other of said blocks being adapted to be positioned in the other of said auxiliary recesses adjacent said abutment, said last mentioned block and adjacent portions of said body and said abutment having registering key ways formed therein, and a tapering key engaging all of said key ways for preventing said blocks from moving radially from its auxiliary recess and for urging it in a direction to force said first block into said tapered socket.

HOWARD L. SQUIRES.